(12) United States Patent
Umeda et al.

(10) Patent No.: US 6,660,179 B2
(45) Date of Patent: Dec. 9, 2003

(54) SINTERED BODY AND HIGH-FREQUENCY CIRCUIT COMPONENT

(75) Inventors: Hidenobu Umeda, Tokyo (JP); Taku Murase, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/070,706

(22) PCT Filed: Aug. 3, 2001

(86) PCT No.: PCT/JP01/06691

§ 371 (c)(1),
(2), (4) Date: Mar. 12, 2002

(87) PCT Pub. No.: WO02/070432

PCT Pub. Date: Sep. 12, 2002

(65) Prior Publication Data

US 2003/0052299 A1 Mar. 20, 2003

(30) Foreign Application Priority Data

| Mar. 1, 2001 | (JP) | .......... 2001-56152 |
| Mar. 1, 2001 | (JP) | .......... 2001-56153 |
| Mar. 1, 2001 | (JP) | .......... 2001-56412 |
| Mar. 1, 2001 | (JP) | .......... 2001-56413 |

(51) Int. Cl.$^7$ ............................................... C04B 35/32
(52) U.S. Cl. ................... 252/62.6; 252/62.63; 428/469; 428/689; 428/699; 428/697
(58) Field of Search ............................ 252/62.63, 62.6; 428/469, 689, 697, 699

(56) References Cited

U.S. PATENT DOCUMENTS

2003/0091841 A1 * 5/2003 Marusawa .................. 428/469

FOREIGN PATENT DOCUMENTS

| JP | 59-181576 | 10/1984 |
| JP | 62-90909 | 4/1987 |
| JP | 63-16238 | 1/1988 |
| JP | 9-124322 | 5/1997 |
| JP | 9-167703 | 6/1997 |
| JP | 9-205031 | 8/1997 |

OTHER PUBLICATIONS

Translation for JP 09–167703.*

* cited by examiner

*Primary Examiner*—C. Melissa Koslow
(74) *Attorney, Agent, or Firm*—Oblon, Spivak, McClelland, Maier & Neustadt, P.C.

(57) ABSTRACT

There is provided a sintered body at least 80% of which is constituted of a Y-type hexagonal ferrite. The sintered body contains, as main components, a cobalt oxide, a copper oxide, an iron oxide and AO (AO is at least one of BaO or SrO) in predetermined amounts in mol %, more preferably contains MO (MO is at least one of NiO, ZnO or MgO) in a predetermined amount in mol % in addition to the above components, and also contains, as additional components, bismuth oxide ($Bi_2O_3$), borosilicate glass, borosilicate zinc glass or bismuth glass in predetermined amounts in wt %. Thus, a sintered body which exhibits good magnetic properties and is usable up to a high frequency band ranging from several hundred megahertz to gigahertz, contains as few hetero phases other than a Y-type hexagonal ferrite as possible and can be calcined at a temperature of not higher than 1,000° C., particularly about 900° C., and a high-frequency circuit component using the sintered body can be provided.

20 Claims, 1 Drawing Sheet

SINTERED BODY AND HIGH-FREQUENCY CIRCUIT COMPONENT

TECHNICAL FIELD

The present invention relates to a sintered body used in a high-frequency circuit component and a high-frequency circuit component using the sintered body.

BACKGROUND ART (1) In recent years, along with a size reduction in electronic equipment and a movement toward higher-frequency electronic equipment, demand for an electronic part having a high inductance and a high impedance in a high-frequency band has been increasing. To obtain a compact electronic part having a high inductance and a high impedance, it is desirable to prepare a coil having the multilayer structure that a conductive body is incorporated into a magnetic material by a so-called printing method or sheeting method.

The number of turns of the coil can be increased due to the multilayer structure and the structure is a closed magnetic circuit, so that a high inductance and a high impedance can be obtained.

As a conductive body to be incorporated into a sintered body, in general, silver (Ag) is often used in consideration of electric resistivity, a melting point and costs. Since the melting point of silver is not higher than 1,000° C., an NiZn-based ferrite which exhibits a high sintered density even when based at 900° C. has heretofore been generally used as a magnetic material for the multilayer structure.

However, since the NiZn-based ferrite has low magnetic anisotropy, it causes natural resonance at frequencies of several hundred megahertz, so that it cannot be used within a frequency band of gigahertz.

Although an air-core coil using a non-magnetic material is sometimes used as a high-frequency specification, use of the non-magnetic material makes it difficult to obtain a high inductance and a high impedance.

Meanwhile, a hexagonal ferrite hardly causes natural resonance and has high permeability even within a frequency band of gigahertz since the magnetic anisotropy in the in-plane direction of a hexagonal plate crystal is different from that in the direction perpendicular to the in-plane direction. However, in the case of the hexagonal ferrite, the firing temperature must be high in order to obtain desired sintered density and magnetic properties.

Although it has heretofore been attempted to sinter a hexagonal ferrite at a temperature lower than or equal to the melting point of Ag by using a low-melting-point oxide in the hexagonal ferrite, the yield of soft magnetic phase is low, and it is difficult to cause the magnetic properties of the hexagonal ferrite to be fully exhibited.

One of the prior arts related and similar to the present invention is Japanese Patent Application Laid-Open No. 167703-1997. In the gazette, a study is made with a particular emphasis on a Z-type hexagonal ferrite (Ba, Sr, Pb)$_3$(Co$_{1-x}$Cu$_x$)$_2$Fe$_{24}$O$_{42}$, and V$_2$O$_5$, CuO, Bi$_2$O$_3$, MoO$_3$, WO$_3$ and PbO are added to attempt firing at low temperatures.

Further, in the gazette, reports are made on firing of a hexagonal ferrite whose primary phase is an M-type, Y-type, W-type, X-type or U-type. Particularly, in the case of a hexagonal ferrite with a Y-type primary phase which is disclosed in a specific example, that is, (Ba)$_2$(Co$_{1-x}$Cu$_x$)$_2$Fe$_{12}$O$_{22}$, the proportion of Y-type hexagonal ferrite is not described and unknown, but since its calcination temperature is as extremely low as 700° C., its proportion is as high as about 50%, or lower when additives are added, so that it can be said that the proportion does not exceed 80% unlike the present invention. Therefore, obtained magnetic properties are not satisfactory at all. That is, although the compositions and the addition of the substances in the gazette make low-temperature firing possible, the calcination temperature is not studied sufficiently, and the magnetic properties after firing cannot be fully exhibited due to a low yield of soft magnetic phase after sintering. It can be said that this causes the problem that a high inductance and a high impedance cannot be obtained easily.

In addition, the content of CuO in the gazette is lower than that in the present invention, and there exists the problem that even if the effect of additives is considered, high properties cannot be obtained by increasing the yield of the Y-type hexagonal ferrite by firing about 900° C.

(2) In addition to the problems described in the above (1), there still exist the following problems to be solved. That is, the electric resistivity of a conventional, so-called Y-type hexagonal ferrite is as high as about $1 \times 10^5$ Ω·m at the highest, while the electric resistivity of a Y-type hexagonal ferrite substituted with Cu or Zn for the purpose of obtaining high properties is about $1 \times 10^4$ Ω·m, and it cannot but be said that these values are lower than the values exceeding an electric resistivity of $1 \times 10^5$ Ω·m which is required for materials for electronic parts.

Further, since a hexagonal ferrite has a higher dielectric constant than a spinel-type ferrite, parasitic capacitance occurring in an inductor becomes large, so that the inductor is liable to cause self-resonance and an inductance and an impedance are lowered.

(3) Even if the problems described in the above (1) are solved to some degree, a further improvement in magnetic properties or the like, particularly a further improvement in permeability within a high-frequency band, is desired in the technical field associated with the present application.

By further improving the permeability within a high-frequency band, a higher inductance can be obtained (i) when the hexagonal ferrite is used as an inductance part, and higher impedance properties can be obtained (ii) when the hexagonal ferrite is used as a noise filter part.

(4) In addition to the problem described in the above (3), there still exist the following problems to be solved. That is, the electric resistivity of a conventional, so-called Y-type hexagonal ferrite is as high as about $1 \times 10^5$ Ω·m at the highest while the electric resistivity of a Y-type hexagonal ferrite substituted with Cu or Zn for the purpose of obtaining high properties is about $1 \times 10^4$ Ω·m, and it cannot but be said that these values are lower than the values exceeding an electric resistivity of $1 \times 10^5$ Ω·m which is required for materials for electronic parts.

Further, since a hexagonal ferrite has a higher dielectric constant than a spinel-type ferrite, parasitic capacitance occurring in an inductor becomes large, so that the inductor is liable to cause self-resonance and an inductance and an impedance are lowered.

DISCLOSURE OF THE INVENTION

The present invention has been invented to solve the above problems of the prior art. That is, the invention of a first group of the present invention has been invented for solving the problem of the prior art which has been described in the above (1). An object thereof is to provide a sintered body which exhibits good magnetic properties and is usable up to a high frequency band ranging from several hundred megahertz to gigahertz, contains as few hetero phases other than a Y-type hexagonal ferrite as possible and can be calcined at a temperature of not higher than 1,000° C., particularly about 900° C., and a high-frequency circuit component using the sintered body. To solve such a problem, the present invention is a sintered body at least 80% of which is constituted of a Y-type hexagonal ferrite, wherein the sintered body contains, as main components, a cobalt oxide in an amount of 3 to 15 mol % in terms of CoO, a copper oxide in an amount of 5.5 to 17 mol % in terms of CuO, an iron oxide in an amount of 57 to 61 mol % in terms of $Fe_2O_3$ and AO (AO is at least one of BaO or SrO) as the balance, and also contains, as an additional component, 0.5 to 7 wt % of bismuth oxide ($Bi_2O_3$). Further, the present invention is a high-frequency circuit component having the structure that a conductive body is embedded in a sintered body, wherein a Y-type hexagonal ferrite constitutes at least 80% of the sintered body, and the sintered magnetic oxide contains, as main components, a cobalt oxide in an amount of 3 to 15 mol % in terms of CoO, a copper oxide in an amount of 5.5 to 17 mol % in terms of CuO, an iron oxide in an amount of 57 to 61 mol % in terms of $Fe_2O_3$ and AO (AO is at least one of BaO or SrO) as the balance, and also contains, as an additional component, 0.5 to 7 wt % of bismuth oxide ($Bi_2O_3$).

The invention of a second group of the present invention has been invented for solving the problem of the prior art which has been described in the above (2). An object thereof is to provide a sintered body which can be calcined at a temperature of not higher than 1,000° C., particularly about 900° C., has high electric resistivity and a low dielectric constant and contains a Y-type hexagonal ferrite as a main ferrite component and a high-frequency circuit component using the sintered body. To solve such a problem, the present invention is a sintered body at least 80% of which is constituted of a Y-type hexagonal ferrite, wherein the sintered body contains, as main components, a cobalt oxide in an amount of 3 to 15 mol % in terms of CoO, a copper oxide in an amount of 5 to 17 mol % in terms of CuO, an iron oxide in an amount of 57 to 61 mol % in terms of $Fe_2O_3$ and AO (AO is at least one of BaO or SrO) as the balance and also contains, as an additional component, 0.6 to 7 wt % of borosilicate glass, borosilicate zinc glass or bismuth glass. Further, the present invention is a high-frequency circuit component having the structure that a conductive body is embedded in a sintered body, wherein a Y-type hexagonal ferrite constitutes at least 80% of the sintered body, and the sintered body contains, as main components, a cobalt oxide in an amount of 3 to 15 mol % in terms of CoO, a copper oxide in an amount of 5 to 17 mol % in terms of CuO, an iron oxide in an amount of 57 to 61 mol % in terms of $Fe_2O_3$ and AO (AO is at least one of BaO or SrO) as the balance and also contains, as an additional component, 0.6 to 7 wt % of borosilicate glass, borosilicate zinc glass or bismuth glass.

The invention of a third group of the present invention has been invented for solving the problem of the prior art which has been described in the above (3). An object thereof is to provide a sintered body which exhibits extremely good permeability up to a high frequency band ranging from several hundred megahertz to gigahertz, contains as few hetero phases other than a Y-type hexagonal ferrite as possible and can be calcined at a temperature of not higher than 1,000° C., particularly about 900° C., and a high-frequency circuit component using the sintered body. To solve such a problem, the present invention is a sintered body at least 80% of which is constituted of a Y-type hexagonal ferrite, wherein the sintered body contains, as main components, a cobalt oxide in an amount of 3 to 15 mol % in terms of CoO, a copper oxide in an amount of 5 to 17 mol % in terms of CuO, an iron oxide in an amount of 57 to 61 mol % in terms of $Fe_2O_3$, 0 to 15 wt % of MO (MO is at least one of NiO, ZnO or MgO, the content of MO would never be 0), the balance being AO (AO is at least one of BaO or SrO), and also contains, as an additional component, 0.5 to 7 wt % of bismuth oxide ($Bi_2O_3$). Further, the present invention is a high-frequency circuit component having the structure that a conductive body is embedded in a sintered body, wherein a Y-type hexagonal ferrite constitutes at least 80% of the sintered body, and the sintered body contains, as main components, a cobalt oxide in an amount of 3 to 15 mol % in terms of CoO, a copper oxide in an amount of 5 to 17 mol % in terms of CuO, an iron oxide in an amount of 57 to 61 mol % in terms of $Fe_2O_3$, 0 to 15 wt % of MO (MO is at least one of NiO, ZnO or MgO, the content of MO would never be 0), and AO (AO is at least one of BaO or SrO) as the balance, and also contains, as an additional component, 0.5 to 7 wt % of bismuth oxide ($Bi_2O_3$).

The invention of a fourth group of the present invention has been invented for solving the problem of the prior art which has been described in the above (4). An object thereof is to provide a sintered body which can be calcined at a temperature of not higher than 1,000° C., particularly about 900° C., has good permeability in a high-frequency band, high electric resistivity and a low dielectric constant and contains a Y-type hexagonal ferrite as a main ferrite component and a high-frequency circuit component using the sintered body. To solve such a problem, the present invention is a sintered body at least 80% of which is constituted of a Y-type hexagonal ferrite, wherein the sintered body contains, as main components, a cobalt oxide in an amount of 3 to 15 mol % in terms of CoO, a copper oxide in an amount of 5 to 17 mol % in terms of CuO, an iron oxide in an amount of 57 to 61 mol % in terms of $Fe_2O_3$, 0 to 15 wt % of MO (MO is at least one of NiO, ZnO or MgO, the content of MO would never be 0), and AO (AO is at least one of BaO or SrO) as the balance, and also contains, as an additional component, 0.6 to 7 wt % of borosilicate glass, borosilicate zinc glass or bismuth glass. Further, the present invention is a high-frequency circuit component having the structure that a conductive body is embedded in a sintered body, wherein the sintered body contains, as main components, a cobalt oxide in an amount of 3 to 15 mol % in terms of CoO, a copper oxide in an amount of 5 to 17 mol % in terms of CuO, an iron oxide in an amount of 57 to 61 mol % in terms of $Fe_2O_3$, 0 to 15 wt % of MO (MO is at least one of NiO, ZnO or MgO, the content of MO would never be 0), an AO (AO is at least one of BaO or SrO) as the balance, and also contains, as an additional component, 0.6 to 7 wt % of borosilicate glass, borosilicate zinc glass or bismuth glass.

BEST MODE OF EMBODYING THE INVENTION

Figure 1:
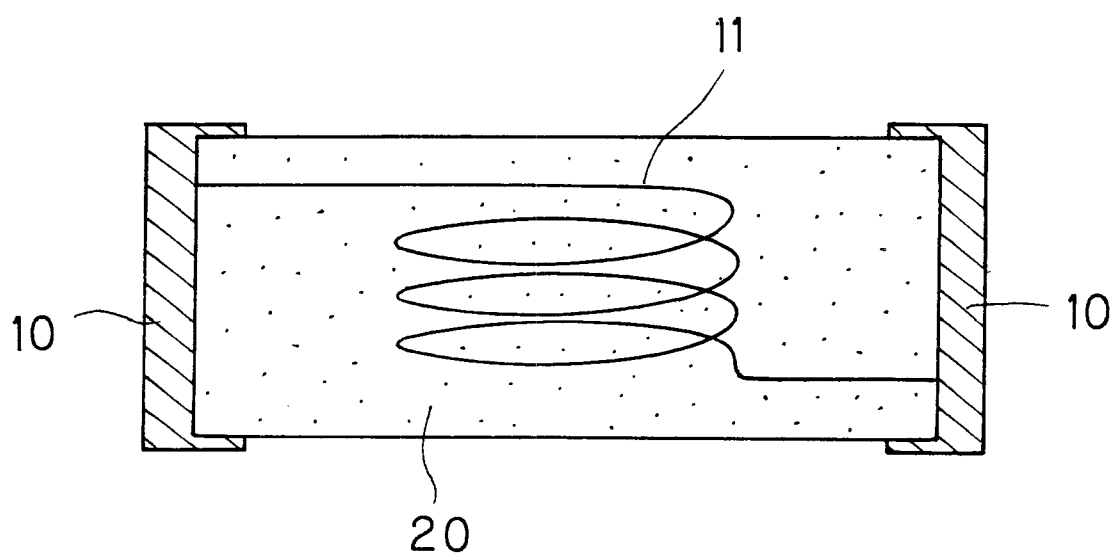
FIG. 1 is a schematic diagram of the inductor used in Examples.

A detailed description will be given to the sintered body of the present invention hereinafter.

(1) Description of The First Invention Group

Since the sintered body in the first invention group of the present invention is sintered body, it can be produced by a general ceramic production process.

The sintered body in the first invention group of the present invention contains, as main components, a cobalt oxide in an amount of 3 to 15 mol % (preferably 5 to 10 mol %) in terms of CoO, a copper oxide in an amount of 5.5 to 17 mol % (preferably 10 to 15 mol %) in terms of CuO, an iron oxide in an amount of 57 to 61 mol % (preferably 59 to 60 mol %) in terms of $Fe_2O_3$, and AO (AO is at least one of BaO or SrO) as the balance. The AO may be BaO, SrO or a mixture thereof.

Further, the sintered body of the present invention also contains 0.5 to 7 wt % (preferably 0.6 to 5 wt %) of bismuth oxide ($Bi_2O_3$) as an additional component.

As is understood from Examples to be described later, the bismuth oxide ($Bi_2O_3$) is added in the form of the oxide and generally remains in the form of the oxide even after sintering.

As for the contents of the above main components, when the content of CoO is lower than 3 mol %, the inconvenience that permeability at 2 GHz decreases (for example, to a value less than 2.0) is liable to occur, while when the content of CoO is higher than 15 mol %, the inconvenience that permeability at 500 MHz decreases (for example, to a value less than 2.0) is liable to occur.

Further, when the content of CuO is lower than 5.5 mol %, the inconvenience that the calcination temperature exceeds 1,000° C. is liable to occur, while when the content of CuO is higher than 17 mol %, the inconvenience that permeability decreases (for example, to a value less than 2.0) is liable to occur.

Further, when the content of $Fe_2O_3$ is lower than 57 mol % or higher than 61 mol %, the inconvenience that permeability decreases is liable to occur.

As for the content of the above additional component, when the content of the above $Bi_2O_3$ is lower than 0.5 wt %, the inconvenience that at least 90% of theoretical density cannot be obtained by firing at a temperature of not higher than 1,000° C. is liable to occur, while when the content of the above $Bi_2O_3$ is higher than 7 wt %, the inconvenience that permeability decreases is liable to occur.

The addition of such an additional component as $Bi_2O_3$, particularly together with the inclusion of the above CuO, markedly accomplishes low-temperature sintering. They also cause such a synergistic effect as an improvement in magnetic properties. When the firing temperature is lowered, an electrode-incorporated closed magnetic circuit component can be produced easily by firing the sintered magnetic oxide with a low-melting-point electrode material such as Ag which is inexpensive and has a low electrical resistance incorporated therein. The thus-produced component is used in a high-frequency component (high-frequency circuit component) such as an inductor which is compact and has a high Q value or a noise filter which is compact and exhibits a high,impedance at a particular frequency in a high-frequency band.

In addition, at least 80%, particularly preferably at least 90%, of the sintered body in the present invention is constituted of a Y-type hexagonal ferrite. The unit "%" as used herein is calculated from the ratio of main peaks of X-ray diffraction intensity.

When the proportion of the Y-type hexagonal ferrite is lower than 80%, the inconvenience that high permeability cannot be obtained at high frequencies occurs, thereby making it difficult to obtain a high-frequency circuit component having a high inductance and a high impedance.

When the sintered body is sintered together with a low-melting-point metal such as silver (Ag), the firing temperature is lowered. Therefore, the Y-type hexagonal ferrite must be produced in a proportion of at least 80% at the time of calcination so that the proportion of the Y-type hexagonal ferrite after sintering should be at least 80%. Although depending on the composition, the decomposition of $BaFe_{12}O_{19}$ and $BaFe_2O_4$ starts at about 850° C. to begin the production of the Y-type hexagonal ferrite.

However, when the decompositions of $BaFe_{12}O_{19}$ and $BaFe_2O_4$ do not proceed sufficiently, the production of the Y-type hexagonal ferrite does not proceed. Therefore, to have at least 80% of the Y-type hexagonal ferrite, the calcination temperature must be at least 850° C., particularly 850 to 1,000° C. Further, CuO must be contained in an amount of 5.5 to 17 mol %. When the calcination temperature is lower than 850° C. or the amount of CuO is out of the above range, it is difficult to produce the Y-type hexagonal ferrite in a proportion of higher than 80%. Meanwhile, when the calcination temperature is much higher than 1,000° C., fine milled powders cannot be obtained. The preparation of the fine milled powders is an extremely important technique in low-temperature firing.

From these standpoints, to achieve a high yield of the Y-type hexagonal ferrite at calcination temperatures of 850 to 1,000° C. as described above, CuO as a main component must be contained in an amount of 5.5 to 17 mol %.

The sintered body of the present invention is used as a high-frequency circuit component having the structure that a conductive body is embedded in the sintered body, such as an impeder or an inductor.

The present invention will be described in more detail with reference to Examples hereinafter.

[Experiment 1-I]

(Preparations of Example Samples and Comparative Example Samples)

Each material was weighed so that the compositions of ferrites after sintering should become those shown in the following Table 1, and the materials were wet-blended in a steel ball mill for 15 hours. Then, these mixed powders were calcined in the air at the temperatures shown in Table 1 for 2 hours. Then, after predetermined amounts of $Bi_2O_3$ as an additional component were added as shown in Table 1, the calcined materials were milled in a steel ball mill for 15 hours.

The thus-obtained hexagonal ferrite powders were granulated and formed into desired shapes at a pressure of 100 MPa.

These green compacts were sintered at the firing temperatures shown in Table 1 for 2 hours. The compositions of the sintered hexagonal ferrites are as shown in the following Table 1. These samples were measured for density and magnetic permeabilities at frequencies of 500 MHz and 2 GHz at 25° C., and the results of the measurements are shown in Table 1. The target magnetic permeabilities at frequencies of 500 MHz and 2 GHz each are a value of at least 2.0.

In addition, the proportion of a Y-type hexagonal ferrite was calculated from the ratio of intensities of X-ray diffraction peaks using the milled powders of the sintered body.

TABLE 1

| Sample No. | Main Components (mol %) | | | | | Additional Component (wt %) | Calcination Temperature (° C.) | Firing Temperature (° C.) | Proportion of Y-Type (%) | Density (Mg/m³) | Permeability | |
|---|---|---|---|---|---|---|---|---|---|---|---|---|
| | $Fe_2O_3$ | CoO | CuO | BaO | SrO | $Bi_2O_3$ | | | | | 500 MHz | 2 GHz |
| Example 1 | 60 | 15 | 5.5 | 19.5 | — | 5 | 1000 | 930 | 95 | 5.2 | 2.1 | 2.1 |
| Example 2 | 60 | 10 | 10 | 20 | — | 5 | 950 | 930 | 95 | 5.3 | 2.6 | 2.6 |
| Example 3 | 60 | 3 | 17 | 20 | — | 5 | 950 | 930 | 95 | 5.3 | 3.0 | 2.8 |
| Example 4 | 57 | 15 | 5.5 | 22.5 | — | 5 | 1000 | 930 | 95 | 5.2 | 2.0 | 2.0 |
| Example 5 | 61 | 14.5 | 5.5 | 19 | — | 5 | 1000 | 930 | 95 | 5.2 | 2.0 | 2.0 |
| Example 6 | 60 | 5 | 15 | 10 | 10 | 5 | 950 | 930 | 95 | 5.3 | 3.2 | 3.2 |
| Comparative Example 1 | 60 | 17 | 3 | 20 | — | 5 | 1100 | 930 | 95 | 5.0 | 1.8 | 1.8 |
| Comparative Example 2 | 60 | 2 | 18 | 20 | — | 5 | 950 | 930 | 95 | 5.3 | 2.5 | 1.8 |
| Comparative Example 3 | 56 | 15 | 5 | 24 | — | 5 | 1000 | 930 | 73 | 5.2 | 1.9 | 1.9 |
| Comparative Example 4 | 62 | 15 | 5 | 20 | — | 5 | 1000 | 930 | 77 | 5.2 | 1.9 | 1.9 |
| Example 7 | 60 | 5 | 15 | 20 | — | 0.5 | 950 | 930 | 100 | 5.2 | 3.7 | 3.7 |
| Comparative Example 5 | 60 | 5 | 15 | 20 | — | 0.1 | 950 | 930 | 100 | 4.8 | 3.5 | 3.5 |
| Example 8 | 60 | 15 | 5.5 | 19.5 | — | 7 | 1000 | 930 | 90 | 5.3 | 2.0 | 2.0 |
| Comparative Example 6 | 60 | 15 | 5.5 | 19.5 | — | 10 | 1000 | 930 | 85 | 5.5 | 1.9 | 1.9 |
| Example 9 | 60 | 15 | 5.5 | 19.5 | — | 5 | 900 | 930 | 83 | 5.0 | 2.0 | 2.0 |
| Example 10 | 60 | 5 | 15 | 20 | — | 5 | 850 | 930 | 90 | 5.0 | 3.2 | 3.2 |
| Comparative Example 7 | 60 | 15 | 5.5 | 19.5 | — | 5 | 850 | 930 | 46 | 4.7 | 1.8 | 1.8 |
| Comparative Example 8 | 60 | 15 | 5.5 | 19.5 | — | 5 | 800 | 930 | 40 | 4.7 | 1.5 | 1.5 |
| Comparative Example 9 | 60 | 15 | 5 | 20 | — | 1 | 700 | 930 | 30 | 4.5 | 1.5 | 1.5 |

Comparative Example 5 is not preferable because the amount of Bi is small and the density falls short of 90% of theoretical density (5.4 Mg/m³).

[Experiment 1-II]

Then, an impeder was prepared using the magnetic body of the present invention. That is, each material was weighed so that the composition after sintering should become the composition of the sample of Example 7 in the above Table 1, and the materials were wet-blended in a steel ball mill for 15 hours. Then, these mixed powders were calcined in the air at 950° C. for 2 hours. Then, after 5 wt % of $Bi_2O_3$ was added as an additional component, the calcined powders were milled in a steel ball mill for 15 hours.

An organic binder was mixed into the calcined powders, and the paste was formed into a uniform green sheet by a doctor blade process.

For comparison, another green sheet was prepared using NiCuZn-based spinel ferrite powders (NiO=45 mol %, CuO=5 mol %, ZnO=1.5 mol %, $Fe_2O_3$=48 mol %, CoO =0.5 mol %).

Meanwhile, a conductive paste containing silver was prepared, and a coil was stacked in a spiral form on the above green sheet. A pressure was applied in the thickness direction to crimp the coil onto the sheet, thereby preparing a stacked green sheet having the electrode sandwiched between the magnetic bodies. In this way the prepared green chip was sintered at 930° C. for 2 hours. The silver paste was applied to the sides of the internal conductor of the obtained sintered body to bake external electrodes thereto, thereby obtaining an impeder (high-frequency circuit component) whose schematic constitution is shown in FIG. 1. FIG. 1 shows the impeder schematically for the purpose of facilitating understanding of the internal structure thereof. In FIG. 1, reference numeral 11 denotes an inner conductor (Ag coil), reference numeral 10 terminal conductors, and reference numeral 20 a ferrite.

When the impedance and permeability of the thus-obtained impeder were measured at a frequency of 2 GHz, the impedance of the conventional NiCuZn-based spinel ferrite was 135Ω (permeability: 1.2), while the impedance of the magnetic body of the present invention was 208Ω (permeability: 3.7) with the result of an improvement of about 54% or higher over the conventional ferrite.

The effect of the first invention group of the present invention is obvious from the above result. That is, the present invention is a sintered body at least 80% of which is constituted of a Y-type hexagonal ferrite, wherein the sintered magnetic oxide contains, as main components, a cobalt oxide in an amount of 3 to 15 mol % in terms of CoO, a copper oxide in an amount of 5.5 to 17 mol % in terms of CuO, an iron oxide in an amount of 57 to 61 mol % in terms of $Fe_2O_3$, and AO (AO is at least one of BaO or SrO) as the balance, and also contains, as an additional component, 0.5 to 7 wt % of bismuth oxide ($Bi_2O_3$). Thus, a sintered body which exhibits good magnetic properties and is usable up to a high frequency band ranging from several hundred megahertz to gigahertz, contains as few hetero phases other than a Y-type hexagonal ferrite as possible and can be calcined at a temperature of not higher than 1,000° C., particularly about 900° C., and a high-frequency circuit component using the sintered body can be provided.

(2) Description of The Second Invention Group

Since the sintered body in the second invention group of the present invention is sintered body, it can be produced by a general ceramic production process.

The sintered body in the second invention group of the present invention contains, as main components, a cobalt oxide in an amount of 3 to 15 mol % (preferably 3 to 5 mol %) in terms of CoO, a copper oxide in an amount of 5 to 17 mol % (preferably 5.5 to 10 mol %) in terms of CuO, an iron oxide in an amount of 57 to 61 mol % (preferably 59 to 60 mol %) in terms of $Fe_2O_3$, and AO (AO is at least one of BaO or SrO) as the balance. The AO may be BaO, SrO or a mixture thereof.

Further, the sintered body of the present invention also contains 0.6 to 7 wt % (preferably 0.6 to 5 wt %) of borosilicate glass, borosilicate zinc glass or bismuth glass as an additional component.

The borosilicate glass generally indicates glass containing $B_2O_3$ and $SiO_2$, the borosilicate zinc glass generally indicates glass containing $B_2O_3$, $SiO_2$ and ZnO, and the bismuth glass generally indicates glass containing $Bi_2O_3$. In the definitions of these glasses, the above components do not need to be main components.

These additional glass components may be used solely or in admixture of two or three. When they are used in admixture of two or three, the total wt % of the mixture should be within the above range.

By the addition of such glass, an increase in electric resistivity (increasing electric resistivity) or a decrease in dielectric constant (decreasing a dielectric constant) can be achieved. Therefore, by the addition of the glass specified by the present invention, an electric resistivity of at least $1 \times 10^5$ $\Omega \cdot m$ which is required for, for example, a multilayer component material as a high-frequency circuit component. Further, by the addition of the glass specified by the present invention, the effect of decreasing a dielectric constant is also exhibited, and when the sintered body of the present invention is used as a high-frequency component, a high impedance can be attained at high frequencies and the frequency band for the impedance can be widened.

Further, the above glasses must be added in the form of glass. After firing, the glass component used remains in the sintered body regardless of whether the component maintains the glass form.

Of these glasses, borosilicate glass and borosilicate zinc glass are particularly preferable for achieving high electric resistivity and a low dielectric constant more effectively. Further, when the above glasses are added in the same amount, bismuth glass is particularly preferable from the viewpoint that the temperature at which a relative density of at least 90% can be attained can be lowered.

As for the contents of the above main components, when the content of CoO is lower than 3 mol %, the inconvenience that permeability at 2 GHz decreases (for example, to a value less than 2.0) is liable to occur, while when the content of CoO is higher than 15 mol %, the inconvenience that permeability at 500 MHz decreases (for example, to a value less than 2.0) is liable to occur, for example.

Further, when the content of CuO is lower than 5 mol %, the inconvenience that the calcination temperature exceeds 1,000° C. is liable to occur, while when the content of CuO is higher than 17 mol %, the inconvenience that permeability decreases (for example, to a value less than 2.0) is liable to occur.

Further, when the content of $Fe_2O_3$ is lower than 57 mol % or higher than 61 mol %, the inconvenience that permeability decreases is liable to occur.

As for the content of the above additional component, when the content of the above specified glass is lower than 0.6 wt %, the inconvenience that at least 90% of theoretical density cannot be obtained by firing at a temperature of not higher than 1,000° C. is liable to occur, while when the content of the above glass is higher than 7 wt %, the inconvenience that permeability decreases is liable to occur.

The addition of such an additional glass component, particularly together with the inclusion of the above CuO, markedly accomplishes low-temperature sintering. When the firing temperature is lowered, an electrode-incorporated closed magnetic circuit component can be produced easily by firing the sintered body with a low-melting-point electrode material such as Ag which is inexpensive and has a low electrical resistance incorporated therein. The thus-produced component is used in a high-frequency component (high-frequency circuit component) such as an inductor which is compact and has a high Q value or a noise filter which is compact and exhibits a high impedance at a particular frequency in a high-frequency band.

In addition, at least 80%, particularly preferably at least 90%, of the sintered body in the present invention is constituted of a Y-type hexagonal ferrite. The unit "%" as used herein is calculated from the ratio of main peaks of X-ray diffraction intensity.

When the sintered body is sintered together with a low-melting-point metal such as silver (Ag), the firing temperature is lowered. Therefore, the Y-type hexagonal ferrite must be produced in a proportion of at least 80% at the time of calcination so that the proportion of the Y-type hexagonal ferrite after sintering should be at least 80%. Although varying depending on the composition, the decompositions of $BaFe_{12}O_{19}$ and $BaFe_2O_4$ start about 850° C. and the production of the Y-type hexagonal ferrite starts. However, when the decompositions of $BaFe_{12}O_{19}$ and $BaFe_2O_4$ do not proceed sufficiently, the production of the Y-type hexagonal ferrite does not proceed. Therefore, to have at least 80% of the Y-type hexagonal ferrite, the calcination temperature must be at least 850° C., particularly 850 to 1,000° C. Further, CuO must be contained in an amount of 5.5 to 17 mol %. When the calcination temperature is lower than 850° C. or a predetermined amount of CuO is not contained, it is difficult to produce the Y-type hexagonal ferrite in a proportion of higher than 80%. Meanwhile, when the calcination temperature is much higher than 1,000° C., fine milled powders cannot be obtained. The preparation of the fine milled powders is an extremely important technique in low-temperature firing.

From these standpoints, to achieve a high yield of the Y-type hexagonal ferrite at calcination temperatures of 850 to 1,000° C. as described above, CuO as a main component must be preferably contained in an amount of 5.5 to 17 mol %.

The sintered magnetic oxide of the present invention is used as a high-frequency circuit component having the structure that a conductive body is embedded in the sintered magnetic oxide, such as an impeder or an inductor.

The present invention will be described in more detail with reference to Examples hereinafter.

[Experiment 2-I]

(Preparations of Example Samples and Comparative Example Samples)

Each material was weighed so that the compositions of ferrites after sintering should become those shown in the following Table 2, and the materials were wet-blended in a steel ball mill for 15 hours. Then, these mixed powders were calcined in the air at the temperatures shown in Table 2 for 2 hours. Then, after predetermined amounts of the predetermined glasses as an additional component were added as shown in Table 2, the calcined materials were milled in a steel ball mill for 15 hours.

The thus-obtained hexagonal ferrite powders were granulated and formed into desired shapes at a pressure of 100 MPa.

These green compacts were sintered at the firing temperatures shown in Table 2 for 2 hours. The compositions of the sintered hexagonal ferrites are as shown in the following Table 2. These samples were measured for magnetic permeabilities at frequencies of 500 MHz and 2 GHz at 25° C., electric resistivity and a dielectric constant, and the results of the measurements are shown in Table 2. The target magnetic permeabilities at frequencies of 500 MHz and 2 GHz each are a value of at least 2.0. Further, the target electric resistivity is a value of $1 \times 10^5$ Ω·m. The lower the dielectric constant, the better it is. In this regard, it has been found from the experiment results to be described later that when the electric resistivity is higher than $1 \times 10^5$ Ω·m, the dielectric constant exhibits a low value of 30 or smaller.

In addition, the proportion of a Y-type hexagonal ferrite was calculated from the ratio of intensities of X-ray diffraction peaks using the milled powders of the sintered body.

TABLE 2

| Sample No. | Main Components (mol %) | | | | | Additional Component (wt %) | | | Calcination Temperature (° C.) | Firing Temperature (° C.) | Proportion of Y-Type (%) | Permeability | | Electric Resistivity (Ω·m) | Dielectric Constant |
| | $Fe_2O_3$ | CoO | CuO | BaO | SrO | Bismuth Glass | Borosilicate Glass | Borosilicate Zinc Glass | | | | 500 MHz | 2 GHz | | |
|---|---|---|---|---|---|---|---|---|---|---|---|---|---|---|---|
| Example 2-I-1 | 60 | 15 | 5.5 | 19.5 | — | 5 | — | — | 1000 | 930 | 95 | 2.1 | 2.1 | $1 \times 10^6$ | 27 |
| Example 2-I-2 | 60 | 10 | 10 | 20 | — | 5 | — | — | 950 | 930 | 95 | 2.6 | 2.6 | $1 \times 10^6$ | 27 |
| Example 2-I-3 | 60 | 3 | 17 | 20 | — | 5 | — | — | 950 | 930 | 95 | 3.0 | 2.8 | $9 \times 10^5$ | 30 |
| Example 2-I-4 | 57 | 15 | 5.5 | 22.5 | — | 5 | — | — | 1000 | 930 | 95 | 2.0 | 2.0 | $1 \times 10^6$ | 27 |
| Example 2-I-5 | 61 | 15 | 5.5 | 18.5 | — | 5 | — | — | 1000 | 930 | 95 | 2.0 | 2.0 | $1 \times 10^6$ | 27 |
| Example 2-I-6 | 60 | 5 | 15 | 10 | 10 | 5 | — | — | 950 | 930 | 95 | 3.2 | 3.2 | $1 \times 10^6$ | 27 |
| Comparative Example 2-I-1 | 60 | 20 | 0 | 20 | — | 5 | — | — | 1100 | 930 | 95 | 1.8 | 1.8 | $1 \times 10^6$ | 27 |
| Comparative Example 2-I-2 | 60 | 2 | 18 | 20 | — | 5 | — | — | 950 | 930 | 95 | 2.5 | 1.8 | $9 \times 10^5$ | 30 |
| Comparative Example 2-I-3 | 56 | 15 | 5 | 20 | — | 5 | — | — | 1000 | 930 | 73 | 1.9 | 1.9 | $1 \times 10^6$ | 27 |
| Comparative Example 2-I-4 | 62 | 15 | 5 | 20 | — | 5 | — | — | 1000 | 930 | 77 | 1.9 | 1.9 | $1 \times 10^6$ | 27 |
| Example 2-I-7 | 60 | 15 | 5.5 | 19.5 | — | 5 | — | — | 1000 | 930 | 95 | 2.1 | 2.1 | $1 \times 10^6$ | 27 |
| Example 2-I-8 | 60 | 15 | 5.5 | 19.5 | — | 5 | — | — | 900 | 930 | 83 | 2.0 | 2.0 | $1 \times 10^6$ | 27 |
| Comparative Example 2-I-5 | 60 | 15 | 5 | 20 | — | 5 | — | — | 850 | 930 | 46 | 1.8 | 1.8 | $1 \times 10^6$ | 27 |
| Comparative Example 2-I-6 | 60 | 15 | 5 | 20 | — | 5 | — | — | 800 | 930 | 0 | 1.5 | 1.5 | $1 \times 10^6$ | 27 |
| Comparative Example 2-I-7 | 60 | 5 | 15 | 20 | — | 0.3 | — | — | 950 | 930 | 100 | 3.5 | 3.5 | $5 \times 10^4$ | 35 |
| Example 2-I-9 | 60 | 5 | 15 | 20 | — | 0.6 | — | — | 950 | 930 | 100 | 3.7 | 3.7 | $1 \times 10^5$ | 30 |
| Example 2-I-10 | 60 | 5 | 15 | 20 | — | 7 | — | — | 950 | 930 | 95 | 2.0 | 2.0 | $2 \times 10^6$ | 27 |
| Comparative Example 2-I-8 | 60 | 5 | 15 | 20 | — | 10 | — | — | 950 | 930 | 95 | 1.9 | 1.9 | $3 \times 10^6$ | 27 |
| Comparative Example 2-I-9 | 60 | 5 | 5 | 20 | — | — | 0.3 | — | 950 | 930 | 100 | 3.3 | 3.3 | $8 \times 10^4$ | 32 |
| Example 2-I-11 | 60 | 5 | 5 | 20 | — | — | 0.6 | — | 950 | 930 | 100 | 3.5 | 3.5 | $1 \times 10^5$ | 29 |
| Example 2-I-12 | 60 | 5 | 5 | 20 | — | — | 5 | — | 950 | 930 | 95 | 3.1 | 3.1 | $3 \times 10^5$ | 25 |
| Example 2-I-13 | 60 | 5 | 5 | 20 | — | — | 7 | — | 950 | 930 | 95 | 2.1 | 2.1 | $9 \times 10^6$ | 25 |
| Comparative Example 2-I-10 | 60 | 5 | 5 | 20 | — | — | 10 | — | 950 | 930 | 95 | 2.0 | 1.9 | $2 \times 10^7$ | 25 |
| Comparative Example 2-I-11 | 60 | 5 | 5 | 20 | — | — | — | 0.3 | 950 | 930 | 100 | 3.5 | 3.5 | $8 \times 10^4$ | 31 |

TABLE 2-continued

| | Main Components (mol %) | | | | | Additional Component (wt %) | | | Calcination Temperature (° C.) | Firing Temperature (° C.) | Proportion of Y-Type (%) | Permeability | | Electric Resistivity (Ω · m) | Dielectric Constant |
|---|---|---|---|---|---|---|---|---|---|---|---|---|---|---|---|
| Sample No. | Fe$_2$O$_3$ | CoO | CuO | BaO | SrO | Bismuth Glass | Borosilicate Glass | Borosilicate Zinc Glass | | | | 500 MHz | 2 GHz | | |
| Example 2-I-14 | 60 | 5 | 5 | 20 | — | — | — | 0.6 | 950 | 930 | 100 | 3.7 | 3.7 | 2 × 10$^5$ | 28 |
| Example 2-I-15 | 60 | 5 | 5 | 20 | — | — | — | 5 | 950 | 930 | 95 | 3.3 | 3.3 | 6 × 10$^6$ | 25 |
| Example 2-I-16 | 60 | 5 | 5 | 20 | — | — | — | 7 | 950 | 930 | 95 | 2.2 | 2.2 | 3 × 10$^7$ | 25 |
| Comparative Example 2-I-12 | 60 | 5 | 5 | 20 | — | — | — | 10 | 950 | 930 | 95 | 1.9 | 1.9 | 5 × 10$^7$ | 25 |
| Example 2-I-17 | 60 | 5 | 5 | 20 | — | 5 | — | — | 850 | 930 | 90 | 3.5 | 3.1 | 9 × 10$^5$ | 30 |
| Example 2-I-18 | 60 | 5 | 5 | 20 | — | 5 | — | — | 950 | 930 | 95 | 3.3 | 3.3 | 1 × 10$^6$ | 27 |

Calcination in Example 2-I-17 was carried out at 850° C. for 10 hours.

[Experiment 2-II]

A variety of samples were prepared by varying the types and amounts of the additional components to be added to the main components of Example 2-I-6 of the above Experiment 2-I as shown in the following Table 3. These samples were measured for the temperature at which a relative density of at least 90% (based on a theoretical density of 100).

The results are shown in the following Table 3.

TABLE 3

| Additional Components | Amount of Glass Added | | | | |
|---|---|---|---|---|---|
| | 0.6 wt % | 1 wt % | 3 wt % | 5 wt % | 7 wt % |
| Borosilicate Glass | 1000° C. | 1000° C. | 950° C. | 950° C. | 900° C. |
| Borosilicate Zinc Glass | 1000° C. | 1000° C. | 950° C. | 950° C. | 900° C. |
| Bismuth Glass | 1000° C. | 950° C. | 900° C. | 900° C. | 900° C. |

[Experiment 2-III]

Then, an inductance element was prepared using the magnetic body of the present invention. That is, each material was weighed so that the composition after sintering should become the composition of the Example 2-I-6 sample in the above Table 2, and the materials were wet-blended in a steel ball mill for 15 hours. Then, these mixed powders were calcined in the air at 950° C. for 2 hours. Then, after 5 wt % of bismuth glass was added as an additional component, the calcined powders were milled in a steel ball mill for 15 hours.

An organic binder was mixed into the calcined powders, and the paste was formed into a uniform green sheet by a doctor blade process.

For comparison, another green sheet was prepared using NiZn-based spinel ferrite powders (NiO=45 mol %, CuO=5 mol %, ZnO=1.5 mol %, Fe$_2$O$_3$=48 mol %, CoO=0.5 mol %).

Meanwhile, a conductive paste containing silver was prepared, and a coil was stacked in a spiral form on the above green sheet. A pressure was applied in the thickness direction to crimp the coil onto the sheet, thereby preparing a stacked green sheet having the electrode sandwiched between the magnetic bodies. In this way the prepared green chip was sintered at 930° C. for 2 hours. The silver paste was applied to the sides of the internal conductor of the obtained sintered body to bake external electrodes thereto, thereby obtaining an impeder (high-frequency circuit component) whose schematic constitution is shown in FIG. 1. FIG. 1 shows the impeder schematically for the purpose of facilitating understanding of the internal structure thereof. In FIG. 1, reference numeral 11 denotes an inner conductor (Ag coil), reference numeral 10 terminal conductors, and reference numeral 20 a ferrite.

When the impedance and permeability of the obtained inductance element were measured at a frequency of 2 GHz, the impedance of the magnetic body of the present invention was 208Ω (permeability: 3.7), while the impedance of the NiCuZn ferrite was 135Ω (permeability: 1.2)

The effect of the second invention group of the present invention is obvious from the above result. That is, the present invention is a sintered body at least 80% of which is constituted of a Y-type hexagonal ferrite, wherein the sintered magnetic oxide contains, as main components, a cobalt oxide in an amount of 3 to 15 mol % in terms of CoO, a copper oxide in an amount of 5 to 17 mol % in terms of CuO, an iron oxide in an amount of 57 to 61 mol % in terms of Fe$_2$O$_3$, and AO (AO is at least one of BaO or SrO) as the balance, and also contains, as an additional component, 0.6 to 7 wt % of borosilicate glass, borosilicate zinc glass or bismuth glass. Thus, a sintered body which can be calcined at a temperature of not higher than 1,000° C., particularly about 900° C., has high electric resistivity and a low dielectric constant and contains a Y-type hexagonal ferrite as a main ferrite component and a high-frequency circuit component using the sintered body can be provided.

(3) Description of the Third Invention Group

Since the sintered body in the third invention group of the present invention is sintered body, it can be produced by a general ceramic production process.

The sintered body in the third invention group of the present invention contains, as main components, a cobalt oxide in an amount of 3 to 15 mol % (preferably 3 to 5 mol %) in terms of CoO, a copper oxide in an amount of 5 to 17 mol % (preferably 5.5 to 10 mol %) in terms of CuO, an iron oxide in an amount of 57 to 61 mol % (preferably 59 to 60 mol %) in terms of Fe$_2$O$_3$, MO (MO is at least one of NiO, ZnO or MgO, the content of MO would never be 0) in an amount of 0 to 15 wt %, preferably 1 to 15 wt %, particularly preferably 5 to 15 wt %, and AO (AO is at least one of BaO or SrO) as the balance. The MO may be NiO, ZnO, MgO or a mixture of at least two of these compounds. When a mixture of at least two of these compounds is used as the MO, the total mol % of the mixture should be within the above range. The AO may be BaO, SrO or a mixture thereof.

Further, the sintered body of the present invention also contains 0.5 to 7 wt % (preferably 0.6 to 5 wt %) of bismuth oxide ($Bi_2O_3$) as an additional component.

As is understood from Examples to be described later, the bismuth oxide ($Bi_2O_3$) is added in the form of the oxide and generally remains in the form of the oxide even after sintering.

As for the contents of the above main components, when the content of CoO is lower than 3 mol %, for example, the inconvenience that permeability at 2 GHz decreases (for example, to a value less than 2.0) is liable to occur, while when the content of CoO is higher than 15 mol %, the inconvenience that permeability at 500 MHz decreases (for example, to a value less than 2.0) is liable to occur, for example.

Further, when the content of CuO is lower than 5 mol %, the inconvenience that the calcination temperature exceeds 1,000° C. is liable to occur, while when the content of CuO is higher than 17 mol %, the inconvenience that permeability decreases (for example, to a value less than 2.0) is liable to occur.

Further, when the content of $Fe_2O_3$ is lower than 57 mol % or higher than 61 mol %, the inconvenience that permeability decreases is liable to occur.

As for the content of the above additional component, when the content of the above $Bi_2O_3$ is lower than 0.5 wt %, the inconvenience that at least 90% of theoretical density cannot be obtained by firing at a temperature of not higher than 1,000° C. is liable to occur, while when the content of the above $Bi_2O_3$ is higher than 7 wt %, the inconvenience that permeability decreases is liable to occur. The addition of such an additional component as $Bi_2O_3$, particularly together with the inclusion of the above CuO, markedly accomplishes low-temperature sintering. They also cause such a synergistic effect as an improvement in magnetic properties. When the firing temperature is lowered, an electrode-incorporated closed magnetic circuit component can be produced easily by firing the sintered magnetic oxide with a low-melting-point electrode material such as Ag which is inexpensive and has a low electrical resistance incorporated therein.

The thus-produced component is used in a high-frequency component (high-frequency circuit component) such as an inductor which is compact and has a high Q value or a noise filter which is compact and exhibits a high impedance at a particular frequency in a high-frequency band.

When ZnO is contained in an amount of 0 to 15 wt % (the content of ZnO would never be 0) as the MO, permeability can be significantly improved, and a particularly preferable effect is given to the attainment of a high impedance and broadening of the frequency band for the impedance when a high-frequency circuit component is prepared. Meanwhile, when NiO or MgO is contained in an amount of 0 to 15 wt % (the content of ZnO would never be 0) as the MO, permeability is improved and a resonance frequency is increased. Therefore, as a high-frequency circuit component, the sintered magnetic oxide of the present invention exhibits a particularly preferable effect on controlling a high impedance and the band of the impedance.

In addition, at least 80%, particularly preferably at least 90%, of the sintered body in the present invention is constituted of a Y-type hexagonal ferrite. The unit "%" as used herein is calculated from the ratio of main peaks of X-ray diffraction intensity.

When the proportion of the Y-type hexagonal ferrite is lower than 80%, the inconvenience that high permeability cannot be obtained at high frequencies occurs, whereby a high-frequency circuit component having a high inductance and a high impedance cannot be obtained easily.

When the sintered magnetic oxide is sintered together with a low-melting-point metal such as silver (Ag), the firing temperature is lowered. Therefore, the Y-type hexagonal ferrite must be produced in a proportion of at least 80% at the time of calcination so that the proportion of the Y-type hexagonal ferrite after sintering should be at least 80%. Although varying depending on the composition, the decompositions of $BaFe_{12}O_{19}$ and $BaFe_2O_4$ start about 850° C. and the production of the Y-type hexagonal ferrite starts. However, when the decompositions of $BaFe_{12}O_{19}$ and $BaFe_2O_4$ do not proceed sufficiently, the production of the Y-type hexagonal ferrite does not proceed. Therefore, to have at least 80% of the Y-type hexagonal ferrite, the calcination temperature must be at least 850° C., particularly 850 to 1,000° C. Further, CuO must be contained in an amount of preferably 5.5 to 17 mol %. When the calcination temperature is lower than 850° C. or the amount of CuO is out of the above range, it is difficult to produce the Y-type hexagonal ferrite in a proportion of higher than 80%. Meanwhile, when the calcination temperature is much higher than 1,000° C., fine milled powders cannot be obtained. The preparation of the fine milled powders is an extremely important technique in low-temperature firing.

From these standpoints, to achieve a high yield of the Y-type hexagonal ferrite at calcination temperatures of 850 to 1,000° C. as described above, CuO as a main component must be preferably contained in an amount of 5.5 to 17 mol %.

The sintered body of the present invention is used as a high-frequency circuit component having the structure that a conductive body is embedded in the sintered magnetic oxide, such as an impeder or an inductor.

The present invention will be described in more detail with reference to Examples hereinafter.

[Experiment 3-I]
(Preparations of Example Samples and Comparative Example Samples)

Each material was weighed so that the compositions of ferrites after sintering should become those shown in the following Table 4, and the materials were wet-blended in a steel ball mill for 15 hours. Then, these mixed powders were calcined in the air at the temperatures shown in Table 4 for 2 hours. Then, after predetermined amounts of $Bi_2O_3$ as an additional component were added as shown in Table 4, the calcined materials were milled in a steel ball mill for 15 hours.

The thus-obtained hexagonal ferrite powders were granulated and formed into desired shapes at a pressure of 100 MPa.

These green compacts were sintered at the firing temperatures shown in Table 4 for 2 hours. The compositions of the sintered hexagonal ferrites are as shown in the following Table 4. These samples were measured for magnetic permeabilities at frequencies of 500 MHz and 2 GHz at 25° C., and the results of the measurements are shown in Table 4. The target permeability at a frequency of 500 MHz is a value of at least 2.5, and the target permeability at a frequency of 2 GHz is a value of at least 2.0.

In addition, the proportion of a Y-type hexagonal ferrite was calculated from the ratio of intensities of X-ray diffraction peaks using the milled powders of the sintered body.

TABLE 4

| Sample No. | Main Components (mol %) | | | | | | | | Additional Component (wt %) Bi$_2$O$_3$ | Calcination Temperature (°C.) | Firing Temperature (°C.) | Proportion of Y-Type (%) | Density (Mg/m$^3$) | Permeability | |
|---|---|---|---|---|---|---|---|---|---|---|---|---|---|---|---|
| | Fe$_2$O$_3$ | CoO | CuO | ZnO | NiO | MgO | BaO | SrO | | | | | | 500 MHz | 2 GHz |
| Example 3-1 | 60 | 10 | 5.5 | 5 | — | — | 19.5 | — | 5 | 1000 | 930 | 95 | 5.2 | 3.4 | 3.7 |
| Example 3-2 | 60 | 5 | 10 | 5 | — | — | 20 | — | 5 | 950 | 930 | 95 | 5.3 | 3.8 | 3.8 |
| Example 3-3 | 60 | 3 | 17 | 5 | — | — | 15 | — | 5 | 950 | 930 | 95 | 5.3 | 4.3 | 3.9 |
| Example 3-4 | 57 | 10 | 5.5 | 5 | — | — | 22.5 | — | 5 | 1000 | 930 | 95 | 5.1 | 3.0 | 3.0 |
| Example 3-5 | 61 | 9.5 | 5.5 | 5 | — | — | 19 | — | 5 | 1000 | 930 | 95 | 5.3 | 3.0 | 3.0 |
| Example 3-6 | 60 | 5 | 15 | 5 | — | — | 10 | 10 | 5 | 950 | 930 | 95 | 5.1 | 3.9 | 3.9 |
| Comparative Example 3-1 | 60 | 17 | 3 | 5 | — | — | 15 | — | 5 | 1100 | 930 | 95 | 5.0 | 1.8 | 1.8 |
| Comparative Example 3-2 | 60 | 2 | 13 | 5 | — | — | 20 | — | 5 | 950 | 930 | 95 | 5.2 | 2.5 | 1.8 |
| Comparative Example 3-3 | 56 | 10 | 5 | 5 | — | — | 24 | — | 5 | 1000 | 930 | 73 | 5.0 | 2.6 | 1.8 |
| Comparative Example 3-4 | 62 | 10 | 5 | 5 | — | — | 18 | — | 5 | 1000 | 930 | 77 | 5.1 | 2.4 | 2.3 |
| Example 3-7 | 60 | 10 | 5.5 | 5 | — | — | 19.5 | — | 5 | 1000 | 930 | 95 | 5.2 | 3.4 | 3.7 |
| Example 3-8 | 60 | 10 | 5.5 | 5 | — | — | 19.5 | — | 5 | 900 | 930 | 83 | 5.0 | 3.3 | 3.5 |
| Comparative Example 3-5 | 60 | 10 | 5 | 5 | — | — | 20 | — | 5 | 850 | 930 | 46 | 4.7 | 2.8 | 2.8 |
| Comparative Example 3-6 | 60 | 10 | 5 | 5 | — | — | 20 | — | 5 | 800 | 930 | 0 | 4.7 | 1.8 | 1.8 |
| Comparative Example 3-7 | 60 | 15 | 5 | — | — | — | 20 | — | 1 | 700 | 930 | 30 | 4.5 | 1.5 | 1.5 |
| Example 3-9 | 60 | 3 | 15 | 2 | — | — | 20 | — | 0.5 | 950 | 930 | 100 | 5.0 | 3.8 | 3.8 |
| Comparative Example 3-8 | 60 | 3 | 15 | 2 | — | — | 20 | — | 0.3 | 950 | 930 | 100 | 4.8 | 3.6 | 3.6 |
| Example 3-10 | 60 | 10 | 5.5 | 5 | — | — | 19.5 | — | 7 | 1000 | 930 | 90 | 5.3 | 3.5 | 3.7 |
| Comparative Example 3-9 | 60 | 10 | 5 | 5 | — | — | 20 | — | 10 | 1000 | 930 | 85 | 5.5 | 3.0 | 1.9 |
| Example 3-11 | 60 | 5 | 5.5 | 10 | — | — | 19.5 | — | 5 | 1000 | 930 | 95 | 5.2 | 5.1 | 4.2 |
| Example 3-12 | 60 | 3 | 5.5 | 15 | — | — | 16.5 | — | 5 | 1000 | 930 | 95 | 5.2 | 10.1 | 2.2 |
| Example 3-13 | 60 | 10 | 5.5 | — | 5 | — | 19.5 | — | 5 | 1000 | 930 | 95 | 5.2 | 2.7 | 2.3 |
| Example 3-14 | 60 | 5 | 5.5 | — | 10 | — | 19.5 | — | 5 | 1000 | 930 | 95 | 5.2 | 3.3 | 2.6 |
| Example 3-15 | 60 | 3 | 5.5 | — | 15 | — | 16.5 | — | 5 | 1000 | 930 | 95 | 5.2 | 5.8 | 2.0 |
| Example 3-16 | 60 | 10 | 5.5 | — | — | 5 | 19.5 | 10 | 5 | 1000 | 930 | 95 | 5.2 | 2.6 | 2.2 |
| Example 3-17 | 60 | 5 | 5.5 | — | — | 10 | 19.5 | — | 5 | 1000 | 930 | 95 | 5.2 | 3.2 | 2.5 |
| Example 3-18 | 60 | 3 | 5.5 | — | — | 15 | 16.5 | — | 5 | 1000 | 930 | 95 | 5.2 | 6.2 | 2.0 |
| Comparative Example 3-10 | 60 | 15 | 5 | — | — | — | — | — | 5 | 1000 | 930 | 95 | 5.2 | 2.1 | 2.1 |
| Comparative Example 3-11 | 60 | 3 | 5 | 20 | — | — | 12 | — | 5 | 1000 | 930 | 95 | 5.0 | 8.1 | 0.8 |
| Comparative Example 3-12 | 60 | 3 | 5 | — | 20 | — | 12 | — | 5 | 1000 | 930 | 95 | 5.0 | 5.8 | 0.8 |
| Comparative Example 3-13 | 60 | 3 | 5 | — | — | 20 | 12 | — | 5 | 1000 | 930 | 95 | 5.0 | 6.2 | 0.6 |
| Example 3-19 | 57 | 15 | 5.5 | 8 | — | — | 14.5 | — | 5 | 1000 | 930 | 95 | 5.0 | 3.0 | 3.0 |
| Example 3-20 | 60 | 5 | 10 | 5 | — | — | 20 | — | 5 | 850 | 930 | 90 | 5.0 | 3.5 | 3.5 |

Comparative Examples 3-5 and 3-8 are not preferable because the density falls short of 90% of theoretical density (5.4 Mg/m$^3$).
The calcination time of Example 3-20 was 10 hours.

[Experiment Example 3-II]

Then, an inductance element was prepared using the magnetic body of the present invention. That is, each material was weighed so that the composition after sintering should become the composition of the sample of Example 3-11 in the above Table 4, and the materials were wet-blended in a steel ball mill for 15 hours. Then, these mixed powders were calcined in the air at 950° C. for 2 hours. Then, after 5 wt % of Bi$_2$O$_3$ was added as an additional component, the calcined powders were milled in a steel ball mill for 15 hours.

An organic binder was mixed into the calcined powders, and the paste was formed into a uniform green sheet by a doctor blade process.

For comparison, another green sheet was prepared using NiCuZn-based spinel ferrite powders (NiO=45 mol %, CuO=5 mol %, ZnO=1.5 mol %, Fe$_2$O$_3$=48 mol %, CoO= 0.5 mol %).

Meanwhile, a conductive paste containing silver was prepared, and a coil was stacked in a spiral form on the above green sheet. A pressure was applied in the thickness direction to crimp the coil onto the sheet, thereby preparing a stacked green sheet having the electrode sandwiched between the magnetic bodies. In this way the prepared green chip was sintered at 930° C. for 2 hours. The silver paste was applied to the sides of the internal conductor of the obtained sintered body to bake external electrodes thereto, thereby obtaining an impeder (high-frequency circuit component) whose schematic constitution is shown in FIG. 1. FIG. 1 shows the impeder schematically for the purpose of facilitating understanding of the internal structure thereof. In FIG. 1, reference numeral 11 denotes an inner conductor (Ag coil), reference numeral 10 terminal conductors, and reference numeral 20 a ferrite.

When the impedance and permeability of the obtained impeder were measured at a frequency of 2 GHz, the magnetic body of the present invention exhibited an extremely excellent impedance of 236Ω (permeability: 4.2). On the other hand, the impedance of the conventional NiCuZn ferrite was 135Ω (permeability: 1.2).

The effect of the third invention group of the present invention is obvious from the above result. That is, the present invention is a sintered body at least 80% of which is constituted of a Y-type hexagonal ferrite, wherein the sintered magnetic oxide contains, as main components, a cobalt oxide in an amount of 3 to 15 mol % in terms of CoO, a copper oxide in an amount of 5 to 17 mol % in terms of CuO, an iron oxide in an amount of 57 to 61 mol % in terms of $Fe_2O_3$, 0 to 15 wt % of MO (MO is at least one of NiO, ZnO or MgO, the content of MO would never be 0), and AO (AO is at least one of BaO or SrO) as the balance, and also contains, as an additional component, 0.5 to 7 wt % of bismuth oxide ($Bi_2O_3$). Thus, a sintered body which exhibits good magnetic properties up to a high frequency band ranging from several hundred megahertz to gigahertz, contains as few hetero phases other than a Y-type hexagonal ferrite as possible and can be calcined at a temperature of not higher than 1,000° C., particularly about 900° C., and a high-frequency circuit component using the sintered body can be provided.

(4) Description of The Fourth Invention Group

Since the sintered body in the fourth invention group of the present invention is sintered body, it can be produced by a general ceramic production process.

The sintered body in the fourth invention group of the present invention contains, as main components, a cobalt oxide in an amount of 3 to 15 mol % (preferably 3 to 5 mol %) in terms of CoO, a copper oxide in an amount of 5 to 17 mol % (preferably 5.5 to 10 mol %) in terms of CuO, an iron oxide in an amount of 57 to 61 mol % (preferably 59 to 60 mol %) in terms of $Fe_2O_3$, MO (MO is at least one of NiO, ZnO or MgO, the content of MO would never be 0) in an amount of 0 to 15 wt %, preferably 1 to 15 wt %, particularly preferably 5 to 15 wt %, and AO (AO is at least one of BaO or SrO) as the balance.

The MO may be NiO, ZnO, MgO or a mixture of at least two of these compounds. When a mixture of at least two of these compounds is used, the total mol % of the mixture should be within the above range.

The AO may be BaO, SrO or a mixture thereof.

Further, the sintered body of the present invention also contains 0.6 to 7 wt % (preferably 0.6 to 5 wt %) of borosilicate glass, borosilicate zinc glass or bismuth glass as an additional component.

The borosilicate glass generally indicates glass containing $B_2O_3$ and $SiO_2$, the borosilicate zinc glass generally indicates glass containing $B_2O_3$, $SiO_2$ and ZnO, and the bismuth glass generally indicates glass containing $Bi_2O_3$. In the definitions of these glasses, the above components do not need to be main components.

These additional glass components may be used solely or in admixture of two or three. When they are used in admixture of two or three, the total wt % of the mixture should be within the above range. By the addition of such glass, an increase in electric resistivity (increasing electric resistivity) or a decrease in dielectric constant (decreasing a dielectric constant) can be achieved. Therefore, by the addition of the glass specified by the present invention, an electric resistivity of at least $1 \times 10^5$ Ω·m which is required for, for example, a multilayer component material as a high-frequency circuit component.

Further, by the addition of the glass specified by the present invention, the effect of decreasing a dielectric constant is also exhibited, and when the sintered body of the present invention is used as a high-frequency component, a high impedance can be attained at high frequencies and the frequency band for the impedance can be widened. Further, the above glasses must be added in the form of glass. After firing, the glass component used remains in the sintered body regardless of whether the component maintains the glass form.

Of these glasses, borosilicate zinc glass and borosilicate glass are particularly preferable for achieving high resistivity and a low dielectric constant more effectively. Further, when the above glasses are added in the same amount, bismuth glass is particularly preferable from the viewpoint that the temperature at which a relative density of at least 90% can be attained can be lowered.

As for the contents of the above main components, when the content of CoO is lower than 3 mol %, for example, the inconvenience that permeability at 2 GHz decreases (for example, to a value less than 2.0) is liable to occur, while when the content of CoO is higher than 15 mol %, the inconvenience that permeability decreases (for example, permeability at 500 MHz becomes less than 2.5, or permeability at 2 GHz becomes less than 2.0) is liable to occur.

Further, when the content of CuO is lower than 5 mol %, the inconvenience that the calcination temperature exceeds 1,000° C. is liable to occur, while when the content of CuO is higher than 17 mol %, the inconvenience that permeability at 2 GHz decreases is liable to occur.

Further, when the content of $Fe_2O_3$ is lower than 57 mol % or higher than 61 mol %, the inconvenience that permeability decreases is liable to occur.

As for the content of the above additional component, when the content of the above specified glass is lower than 0.6 wt %, the inconvenience that at least 90% of theoretical density cannot be obtained by firing at a temperature of not higher than 1,000° C. is liable to occur, while when the content of the above glass is higher than 7 wt %, the inconvenience that permeability decreases is liable to occur.

The addition of such an additional glass component, particularly together with the inclusion of the above CuO, markedly accomplishes low-temperature sintering. When the firing temperature is lowered, an electrode-incorporated closed magnetic circuit component can be produced easily by firing the sintered body with a low-melting-point electrode material such as Ag which is inexpensive and has a low electrical resistance incorporated therein. The thus-produced component is used in a high-frequency component (high-frequency circuit component) such as an inductor which is compact and has a high Q value or a noise filter which is compact and exhibits a high impedance at a particular frequency in a high-frequency band.

When ZnO is contained in an amount of 0 to 15 wt % (the content of ZnO would never be 0) as the MO, permeability can be significantly improved, and a particularly preferable effect is given to the attainment of a high impedance and broadening of the frequency band for the impedance when a high-frequency circuit component is prepared. Meanwhile, when NiO or MgO is contained in an amount of 0 to 15 wt % (the content of NiO or MgO would never be 0) as the MO, permeability is improved and a resonance frequency is increased. Therefore, as a high-frequency circuit component, the sintered body of the present invention exhibits a particularly preferable effect on controlling a high impedance and the band of the impedance.

In addition, at least 80%, particularly preferably at least 90%, of the sintered magnetic oxide in the present invention is constituted of a Y-type hexagonal ferrite. The unit "%" as used herein is calculated from the ratio of main peaks of X-ray diffraction intensity.

When the sintered magnetic oxide is compact sintered together with a low-melting-point metal such as silver (Ag), the firing temperature is lowered. Therefore, the Y-type hexagonal ferrite must be produced in a proportion of at least 80% at the time of calcination so that the proportion of the Y-type hexagonal ferrite after sintering should be at least 80%. Although varying depending on the composition, the decompositions of $BaFe_{12}O_{19}$ and $BaFe_2O_4$ start about 850° C. and the production of the Y-type hexagonal ferrite starts. However, when the decompositions of $BaFe_{12}O_{19}$ and $BaFe_2O_4$ do not proceed sufficiently, the production of the Y-type hexagonal ferrite does not proceed. Therefore, to have at least 80% of the Y-type hexagonal ferrite, the calcination temperature must be at least 850° C., particularly 850 to 1,000° C. Further, CuO must be contained in an amount of 5.5 to 17 mol %. When the calcination temperature is lower than 850° C. or a predetermined amount of CuO is not contained, it is difficult to produce the Y-type hexagonal ferrite in a proportion of higher than 80%. Meanwhile, when the calcination temperature is much higher than 1,000° C., fine milled powders cannot be obtained. The preparation of the fine milled powders is an extremely important technique in low-temperature firing.

From these standpoints, to achieve a high yield of the Y-type hexagonal ferrite at calcination temperatures of 850 to 1,000° C. as described above, CuO as a main component must be preferably contained in an amount of 5.5 to 17 mol %.

The sintered body of the present invention is used as a high-frequency circuit component having the structure that a conductive body is embedded in the sintered body, such as an impeder or an inductor.

The present invention will be described in more detail with reference to Examples hereinafter.

[Experiment 4-I]

(Preparations of Example Samples and Comparative Example Samples)

Each material was weighed so that the compositions of ferrites after sintering should become those shown in the following Table 5, and the materials were wet-blended in a steel ball mill for 15 hours. Then, these mixed powders were calcined in the air at the temperatures shown in Table 5 for 2 hours. Then, after predetermined amounts of the predetermined glasses as an additional component were added as shown in Table 5, the calcined materials were milled in a steel ball mill for 15 hours.

The thus-obtained hexagonal ferrite powders were granulated and formed into desired shapes at a pressure of 100 MPa.

These green compacts were sintered at the temperatures shown in Table 5 for 2 hours. The compositions of the sintered hexagonal ferrites are as shown in the following Table 5. These samples were measured for magnetic permeabilities at frequencies of 500 MHz and 2 GHz at 25° C., electric resistivity and a dielectric constant, and the results of the measurements are shown in Table 6.

The target permeability at a frequency of 500 MHz is a value of at least 2.5, and the target permeability at a frequency of 2 GHz is a value of at least 2.0. Further, the target electric resistivity is a value of $1\times10^5$ Ω·m. The lower the dielectric constant, the better it is. In this regard, it has been found from the experiment results to be described later that when the electric resistivity is higher than $1\times10^5$ Ω·m, the dielectric constant exhibits a low value of 30 or smaller.

In addition, the proportion of a Y-type hexagonal ferrite was calculated from the ratio of intensities of X-ray diffraction peaks using the milled powders of the sintered body.

TABLE 5

| Sample No. | Main Components (mol %) | | | | | | | | Additional Component (wt %) | | | Calcination Temperature (° C.) | Firing Temperature (° C.) | Proportion of Y-Type (%) |
| | $Fe_2O_3$ | CoO | CuO | ZnO | NiO | MgO | BaO | SrO | Bismuth Glass | Borosilicate Glass | Borosilicate Zinc Glass | | | |
| --- | --- | --- | --- | --- | --- | --- | --- | --- | --- | --- | --- | --- | --- | --- |
| Example 4-I-1 | 60 | 10 | 5.5 | 5 | — | — | 19.5 | — | 5 | — | — | 1000 | 930 | 95 |
| Example 4-I-2 | 60 | 5 | 5.5 | 10 | — | — | 19.5 | — | 5 | — | — | 1000 | 930 | 95 |
| Example 4-I-3 | 60 | 3 | 5.5 | 15 | — | — | 16.5 | — | 5 | — | — | 1000 | 930 | 95 |
| Example 4-I-4 | 60 | 10 | 5.5 | — | 5 | — | 19.5 | — | 5 | — | — | 1000 | 930 | 95 |
| Example 4-I-5 | 60 | 5 | 5.5 | — | 10 | — | 19.5 | — | 5 | — | — | 1000 | 930 | 95 |
| Example 4-I-6 | 60 | 3 | 5.5 | — | 15 | — | 16.5 | 10 | 5 | — | — | 1000 | 930 | 95 |
| Example 4-I-7 | 60 | 10 | 5.5 | — | — | 5 | 19.5 | — | 5 | — | — | 1000 | 930 | 95 |
| Example 4-I-8 | 60 | 5 | 5.5 | — | — | 10 | 19.5 | — | 5 | — | — | 1000 | 930 | 95 |
| Example 4-I-9 | 60 | 3 | 5.5 | — | — | 15 | 16.5 | — | 5 | — | — | 1000 | 930 | 95 |
| Example 4-I-10 | 60 | 14 | 5.5 | 1 | — | — | 19.5 | — | 5 | — | — | 1000 | 930 | 95 |
| Example 4-I-11 | 60 | 14 | 5.5 | — | 1 | — | 19.5 | — | 5 | — | — | 1000 | 930 | 95 |
| Example 4-I-12 | 60 | 14 | 5.5 | — | — | 1 | 19.5 | — | 5 | — | — | 1000 | 930 | 95 |
| Comparative Example 4-I-1 | 60 | 15 | 5 | — | — | — | 20 | — | 5 | — | — | 1000 | 930 | 95 |

TABLE 5-continued

| | Main Components (mol %) | | | | | | | | Additional Component (wt %) | | | Calcination Temperature (° C.) | Firing Temperature (° C.) | Proportion of Y-Type (%) |
|---|---|---|---|---|---|---|---|---|---|---|---|---|---|---|
| Sample No. | Fe$_2$O$_3$ | CoO | CuO | ZnO | NiO | MgO | BaO | SrO | Bismuth Glass | Borosilicate Glass | Borosilicate Zinc Glass | | | |
| Comparative Example 4-I-2 | 60 | 3 | 5 | 20 | — | — | 12 | — | 5 | — | — | 1000 | 930 | 95 |
| Comparative Example 4-I-3 | 60 | 3 | 5 | — | 20 | — | 12 | — | 5 | — | — | 1000 | 930 | 95 |
| Comparative Example 4-I-4 | 60 | 3 | 5 | — | — | 20 | 12 | — | 5 | — | — | 1000 | 930 | 95 |
| Example 4-I-13 | 60 | 5 | 10 | 5 | — | — | 20 | — | 5 | — | — | 900 | 930 | 95 |
| Comparative Example 4-I-5 | 60 | 5 | 10 | 5 | — | — | 20 | — | 5 | — | — | 850 | 930 | 46 |
| Comparative Example 4-I-6 | 60 | 5 | 10 | 5 | — | — | 20 | — | 5 | — | — | 800 | 930 | 0 |
| Example 4-I-14 | 60 | 5 | 10 | 5 | — | — | 20 | — | 5 | — | — | 850 | 930 | 90 |
| Example 4-I-15 | 57 | 15 | 5.5 | 5 | — | — | 17.5 | — | 5 | — | — | 1000 | 930 | 95 |
| Example 4-I-16 | 61 | 10 | 5.5 | 5 | — | — | 18.5 | — | 5 | — | — | 1000 | 930 | 95 |
| Example 4-I-17 | 60 | 3 | 12 | 5 | — | — | 20 | — | 5 | — | — | 1000 | 930 | 95 |
| Example 4-I-18 | 57 | 3 | 17 | 5 | — | — | 18 | — | 5 | — | — | 1000 | 930 | 95 |
| Example 4-I-19 | 60 | 5 | 10 | 5 | — | — | 10 | 10 | 5 | — | — | 1000 | 930 | 95 |
| Comparative Example 4-I-7 | 60 | 5 | 10 | 5 | — | — | 20 | — | 0.3 | — | — | 1000 | 930 | 95 |
| Example 4-I-20 | 60 | 5 | 10 | 5 | — | — | 20 | — | 0.6 | — | — | 1000 | 930 | 95 |
| Example 4-I-21 | 60 | 5 | 10 | 5 | — | — | 20 | — | 7 | — | — | 1000 | 930 | 95 |
| Comparative Example 4-I-8 | 60 | 5 | 10 | 5 | — | — | 20 | — | 10 | — | — | 1000 | 930 | 95 |
| Comparative Example 4-I-9 | 60 | 5 | 10 | 5 | — | — | 20 | — | — | 0.3 | — | 1000 | 930 | 95 |
| Example 4-I-22 | 60 | 5 | 10 | 5 | — | — | 20 | — | — | 0.6 | — | 1000 | 930 | 95 |
| Example 4-I-23 | 60 | 5 | 10 | 5 | — | — | 20 | — | — | 5 | — | 1000 | 930 | 95 |
| Example 4-I-24 | 60 | 5 | 10 | 5 | — | — | 20 | — | — | 7 | — | 1000 | 930 | 95 |
| Comparative Example 4-I-10 | 60 | 5 | 10 | 5 | — | — | 20 | — | — | 10 | — | 1000 | 930 | 95 |
| Comparative Example 4-I-11 | 60 | 5 | 10 | 5 | — | — | 20 | — | — | — | 0.3 | 1000 | 930 | 95 |
| Example 4-I-25 | 60 | 5 | 10 | 5 | — | — | 20 | — | — | — | 0.6 | 1000 | 930 | 95 |
| Example 4-I-26 | 60 | 5 | 10 | 5 | — | — | 20 | — | — | — | 5 | 1000 | 930 | 95 |
| Example 4-I-27 | 60 | 5 | 10 | 5 | — | — | 20 | — | — | — | 7 | 1000 | 930 | 95 |
| Comparative Example 4-I-12 | 60 | 5 | 10 | 5 | — | — | 20 | — | — | — | 10 | 1000 | 930 | 95 |

The calcination time of Example 4-I-14 was 10 hours.

TABLE 6

| Sample No. | Permeability 500 MHz | Permeability 2 GHz | Electric Resistivity ($\Omega \cdot m$) | Dielectric Constant |
|---|---|---|---|---|
| Example 4-I-1 | 3.4 | 3.7 | $1 \times 10^6$ | 27 |
| Example 4-I-2 | 5.1 | 4.2 | $1 \times 10^6$ | 27 |
| Example 4-I-3 | 10.1 | 2.2 | $1 \times 10^6$ | 27 |
| Example 4-I-4 | 2.7 | 2.3 | $1 \times 10^6$ | 27 |
| Example 4-I-5 | 3.3 | 2.6 | $1 \times 10^6$ | 27 |
| Example 4-I-6 | 5.8 | 2.0 | $1 \times 10^6$ | 27 |
| Example 4-I-7 | 2.6 | 2.2 | $1 \times 10^6$ | 27 |
| Example 4-I-8 | 3.2 | 2.5 | $1 \times 10^6$ | 27 |
| Example 4-I-9 | 6.2 | 2.0 | $1 \times 10^6$ | 27 |
| Example 4-I-10 | 2.7 | 2.7 | $1 \times 10^6$ | 27 |
| Example 4-I-11 | 2.5 | 2.2 | $1 \times 10^6$ | 27 |
| Example 4-I-12 | 2.6 | 2.1 | $1 \times 10^6$ | 27 |
| Comparative Example 4-I-1 | 2.1 | 2.1 | $1 \times 10^6$ | 27 |
| Comparative Example 4-I-2 | 8.1 | 0.8 | $1 \times 10^6$ | 27 |
| Comparative Example 4-I-3 | 5.8 | 0.8 | $1 \times 10^6$ | 27 |
| Comparative Example 4-I-4 | 6.2 | 0.6 | $1 \times 10^6$ | 27 |
| Example 4-I-13 | 3.8 | 3.8 | $1 \times 10^6$ | 28 |
| Comparative Example 4-I-5 | 2.6 | 1.8 | $1 \times 10^6$ | 28 |
| Comparative Example 4-I-6 | 1.8 | 1.8 | $1 \times 10^6$ | 28 |
| Example 4-I-14 | 3.8 | 3.8 | $1 \times 10^6$ | 27 |
| Example 4-I-15 | 2.5 | 2.5 | $1 \times 10^6$ | 27 |
| Example 4-I-16 | 3.0 | 3.0 | $1 \times 10^6$ | 27 |
| Example 4-I-17 | 3.5 | 3.3 | $9 \times 10^5$ | 28 |
| Example 4-I-18 | 3.0 | 2.9 | $9 \times 10^5$ | 29 |
| Example 4-I-19 | 3.9 | 3.9 | $1 \times 10^6$ | 27 |
| Camparative Example 4-I-7 | 3.4 | 3.4 | $5 \times 10^4$ | 35 |
| Example 4-I-20 | 3.7 | 3.7 | $3 \times 10^5$ | 29 |
| Example 4-I-21 | 3.8 | 3.8 | $2 \times 10^6$ | 27 |
| Comparative Example 4-I-8 | 3.0 | 1.9 | $3 \times 10^6$ | 27 |
| Comparative Example 4-I-9 | 2.9 | 2.9 | $8 \times 10^4$ | 32 |
| Example 4-I-22 | 3.2 | 3.2 | $3 \times 10^5$ | 29 |
| Example 4-I-23 | 3.4 | 3.4 | $3 \times 10^6$ | 25 |
| Example 4-I-24 | 3.4 | 3.4 | $9 \times 10^6$ | 25 |
| Comparative Example 4-I-10 | 2.5 | 1.8 | $2 \times 10^7$ | 25 |
| Comparative Example 4-I-11 | 2.9 | 2.9 | $8 \times 10^4$ | 31 |
| Example 4-I-25 | 3.5 | 3.5 | $2 \times 10^5$ | 29 |
| Example 4-I-26 | 3.6 | 3.6 | $6 \times 10^6$ | 27 |
| Example 4-I-27 | 3.6 | 3.6 | $3 \times 10^7$ | 27 |
| Comparative Example 4-I-12 | 2.7 | 1.9 | $5 \times 10^7$ | 27 |

[Experiment 4-II]

A variety of samples were prepared by varying the types and amounts of the additional components to be added to the main components of Example 4-I-2 of the above Experiment 4-I as shown in the following Table 7. These samples were measured for the temperature at which a relative density of at least 90% (based on a theoretical density of 100).

The results are shown in the following Table 7.

TABLE 7

| Additional Components | Amount of Glass Added | | | | |
|---|---|---|---|---|---|
|  | 0.6 wt % | 1 wt % | 3 wt % | 5 wt % | 7 wt % |
| Borosilicate Glass | 1000° C. | 1000° C. | 950° C. | 950° C. | 900° C. |
| Borosilicate Zinc Glass | 1000° C. | 1000° C. | 950° C. | 950° C. | 900° C. |
| Bismuth Glass | 1000° C. | 950° C. | 900° C. | 900° C. | 900° C. |

[Experiment 4-III]

Then, an impeder was prepared using the magnetic body of the present invention. That is, each material was weighed so that the composition after sintering should become the composition of the main components of the Example 4-I-2 in the above Table 5, and the materials were wet-blended in a steel ball mill for 15 hours. Then, these mixed powders were calcined in the air at 950° C. for 2 hours. Then, after 5 wt % of bismuth glass was added as an additional component, the calcined powders were milled in a steel ball mill for 15 hours.

An organic binder was mixed into the calcined powders, and the paste was formed into a uniform green sheet by a doctor blade process.

For comparison, another green sheet was prepared using NiCuZn-based spinel ferrite powders (NiO=45 mol %, CuO=5 mol %, ZnO=1.5 mol %, $Fe_2O_3$=48 mol %, CoO=0.5 mol %).

Meanwhile, a conductive paste containing silver was prepared, and a coil was stacked in a spiral form on the above green sheet. A pressure was applied in the thickness direction to crimp the coil onto the sheet, thereby preparing a stacked green sheet having the electrode sandwiched between the magnetic bodies. In this way the prepared green chip was sintered at 930° C. for 2 hours. The silver paste was applied to the sides of the internal conductor of the obtained sintered body to bake external electrodes thereto, thereby obtaining an impeder (high-frequency circuit component) whose schematic constitution is shown in FIG. 1. FIG. 1 shows the impeder schematically for the purpose of facilitating understanding of the internal structure thereof. In FIG. 1, reference numeral 11 denotes an inner conductor (Ag coil), reference numeral 10 terminal conductors, and reference numeral 20 a ferrite.

When the impedance and permeability of the obtained impeder were measured at a frequency of 2 GHz, the magnetic body of the present invention exhibited an extremely excellent impedance of 236Ω (permeability: 4.2). On the other hand, the impedance of the conventional NiCuZn ferrite was 135Ω (permeability: 1.2).

The effect of the fourth invention group of the present invention is obvious from the above result. That is, the present invention is a sintered body at least 80% of which is constituted of a Y-type hexagonal ferrite, wherein the sintered body contains, as main components, a cobalt oxide in an amount of 3 to 15 mo l% in terms of CoO, a copper oxide in an amount of 5 to 17 mol % in terms of CuO, an iron oxide in an amount of 57 to 61 mol % in terms of $Fe_2O_3$, 0 to 15 wt % of MO (MO is at least one of NiO, ZnO or MgO, the content of MO would never be 0), and AO (AO is at least one of BaO or SrO) as the balance, and also contains, as an additional component, 0.6 to 7 wt % of borosilicate glass, borosilicate zinc glass or bismuth glass. Thus, a sintered body which can be calcined at a temperature of not higher than 1,000° C., particularly about 900° C., has high permeability in a high-frequency band, has electric resistivity and a low dielectric constant and contains a Y-type hexagonal ferrite as a main ferrite component and a high-frequency circuit component using the sintered body, can be provided.

Industrial Applicablity

The sintered body in the present invention is used as a high-frequency circuit component having the structure that a conductive body is embedded in the sintered body, such as an impeder or an inductor.

What is claimed is:

1. A sintered body at least 80% of which is constituted of a Y-type hexagonal ferrite, the sintered body containing, as main components, a cobalt oxide in an amount of 3 to 15 mol % in terms of CoO, a copper oxide in an amount of 5.5 to 17 mol % in terms of CuO, an iron oxide in an amount of 57 to 61 mol % in terms of $Fe_2O_3$, and AO (AO is at least one of BaO or SrO) as the balance, and also containing 0.5 to 7 wt % of bismuth oxide ($Bi_2O_3$) as an additional component.

2. The sintered body of claim 1, wherein the calcination temperature in the production of the sintered body is in a range of 850 to 1,000° C.

3. A high-frequency circuit component having the structure that a conductive body is embedded in a sintered body, wherein at least 80% of the sintered body is constituted of a Y-type hexagonal ferrite, and the sintered body contains, as main components, a cobalt oxide in an amount of 3 to 15 mol % in terms of CoO, a copper oxide in an amount of 5.5 to 17 mol % in terms of CuO, an iron oxide in an amount of 57 to 61 mol % in terms of $Fe_2O_3$, and AO (AO is at least one of BaO or SrO) as the balance, and also contains 0.5 to 7 wt % of bismuth oxide ($Bi_2O_3$) as an additional component.

4. The component of claim 3, wherein the calcination temperature in the production of the sintered body is in a range of 850 to 1,000° C.

5. The component of claim 3, wherein the conductive body contains silver (Ag) as a main component.

6. A sintered body at least 80% of which is constituted of a Y-type hexagonal ferrite, the sintered body containing, as main components, a cobalt oxide in an amount of 3 to 15 mol % in terms of CoO, a copper oxide in an amount of 5 to 17 mol % in terms of CuO, an iron oxide in an amount of 57 to 61 mol % in terms of $Fe_2O_3$, and AO (AO is at least one of BaO or SrO) as the balance, and also containing 0.6 to 7 wt % of borosilicate glass, borosilicate zinc glass or bismuth glass as an additional component.

7. The sintered body of claim 6, wherein the calcination temperature in the production of the sintered body is 850 to 1,000° C.

8. A high-frequency circuit component having the structure that a conductive body is embedded in a sintered body, wherein at least 80% of the sintered body is constituted of a Y-type hexagonal ferrite, and the sintered body contains, as main components, a cobalt oxide in an amount of 3 to 15 mol % in terms of CoO, a copper oxide in an amount of 5 to 17 mol % in terms of CuO, an iron oxide in an amount of 57 to 61 mol % in terms of $Fe_2O_3$, and AO (AO is at least one of BaO or SrO) as the balance, and also contains 0.6 to 7 wt % of borosilicate glass, borosilicate zinc glass or bismuth glass as an additional component.

9. The component of claim 8, wherein the calcination temperature in the production of the sintered body is in a range of 850 to 1,000° C.

10. The component of claim 8, wherein the conductive body contains silver (Ag) as a main component.

11. A sintered body at least 80% of which is constituted of a Y-type hexagonal ferrite, the sintered body containing, as main components, a cobalt oxide in an amount of 3 to 15 mol % in terms of CoO, a copper oxide in an amount of 5 to 17 mol % in terms of CuO, an iron oxide in an amount of 57 to 61 mol % in terms of $Fe_2O_3$, 0 to 15 wt % of MO (MO is at least one of NiO, ZnO or MgO, the content of MO would never be 0), and AO (AO is at least one of BaO or SrO) as the balance, and also containing 0.5 to 7 wt % of bismuth oxide ($Bi_2O_3$) as an additional component.

12. The sintered body of claim 11, wherein the calcination temperature in the production of the sintered body is in a range of 850 to 1,000° C.

13. A high-frequency circuit component having the structure that a conductive body is embedded in a sintered body, wherein at least 80% of the sintered body is constituted of a Y-type hexagonal ferrite, and the sintered body contains, as main components, a cobalt oxide in an amount of 3 to 15 mol % in terms of CoO, a copper oxide in an amount of 5 to 17 mol % in terms of CuO, an iron oxide in an amount of 57 to 61 mol % in terms of $Fe_2O_3$, 0 to 15 wt % of MO (MO is at least one of NiO, ZnO or MgO, the content of MO would never be 0), and AO (AO is at least one of BaO or SrO) as the balance, and also contains 0.5 to 7 wt % of bismuth oxide ($Bi_2O_3$) as an additional component.

14. The component of claim 13, wherein the calcination temperature in the production of the sintered body is in a range of 850 to 1,000° C.

15. The component of claim 13, wherein the conductive body contains silver (Ag) as a main component.

16. A sintered body at least 80% of which is constituted of a Y-type hexagonal ferrite, the sintered body containing, as main components, a cobalt oxide in an amount of 3 to 15 mol % in terms of CoO, a copper oxide in an amount of 5 to 17 mol % in terms of CuO, an iron oxide in an amount of 57 to 61 mol % in terms of $Fe_2O_3$, 0 to 15 wt % of MO (MO is at least one of NiO, ZnO or MgO, the content of MO would never be 0), and AO (AO is at least one of BaO or SrO) as the balance, and also containing 0.6 to 7 wt % of borosilicate glass, borosilicate zinc glass or bismuth glass as an additional component.

17. The sintered body of claim 16, wherein the calcination temperature in the production of the sintered body is in a range of 850 to 1,000° C.

18. A high-frequency circuit component having the structure that a conductive body is embedded in a sintered body, wherein the sintered body contains, as main components, a cobalt oxide in an amount of 3 to 15 mol % in terms of CoO, a copper oxide in an amount of 5 to 17 mol % in terms of CuO, an iron oxide in an amount of 57 to 61 mol % in terms of $Fe_2O_3$, 0 to 15 wt % of MO (MO is at least one of NiO, ZnO or MgO, the content of MO would never be 0), and AO (AO is at least one of BaO or SrO) as the balance, and also contains 0.6 to 7 wt % of borosilicate glass, borosilicate zinc glass or bismuth glass as an additional component.

19. The component of claim 18, wherein the calcination temperature in the production of the sintered body is in a range of 850 to 1,000° C.

20. The component of claim 18, wherein the conductive body contains silver (Ag) as a main component.

* * * * *